United States Patent [19]

Atkins et al.

[11] Patent Number: 5,081,195

[45] Date of Patent: Jan. 14, 1992

[54] HYDROLYSIS OF POLYMERS

[75] Inventors: Martin P. Atkins, Sunbury-on-Thamas, England; Ian S. Biggin, Creigiau, Wales; David A. Kidd, Fleet, England

[73] Assignee: BP Chemicals Limited, London, England

[21] Appl. No.: 563,283

[22] Filed: Aug. 6, 1990

[30] Foreign Application Priority Data

Aug. 26, 1989 [GB] United Kingdom ............... 8919455

[51] Int. Cl.$^5$ ............................................... C08F 8/12
[52] U.S. Cl. ............................ 525/355; 525/324.4; 525/362; 525/367; 525/368; 525/369
[58] Field of Search ............... 525/367, 368, 369, 355, 525/362

[56] References Cited

FOREIGN PATENT DOCUMENTS 0305091 3/1989 European Pat. Off. .
1177307 9/1988 U.S.S.R. .

OTHER PUBLICATIONS

Database Chemicl Abstracts (1982), Ref. No. 98(20): 161227t, Wen et al.
Database Chemical Abstracts (1988), Ref. No. 110(12), 96992p, McDonald et al.
Tetrahedum Letters, No. 41, pp. 3917-3920, Moon et al.
Ultrasonics (1987), vol. 25, Jan. 1, pp. 35-39, Davidson et al.

*Primary Examiner*—Bernard Lipman
*Attorney, Agent, or Firm*—Brooks Haidt Haffner & Delahunty

[57] ABSTRACT

This invention relates to a process for hydrolysing polymeric amides with a hydrolysing agent at elevated temperatures under the influence of ultrasound in a homogeneous reaction medium. The reaction is particularly suited to the production of polyacrylic acid from polyacrylamide.

8 Claims, No Drawings

HYDROLYSIS OF POLYMERS

This invention relates to a method of hydrolysis of polymeric amides especially polyacrylamides, to generate the corresponding free acid.

It is well known that polymeric amides can be hydrolysed in the presence of a hydrolysing agent e.g. an alkali or an acid at elevated temperature to generate the corresponding free acid. However, the rate of such thermal hydrolysis is usually slow and may give rise to side reactions due to the relatively high temperatures involved to achieve the desired degree of conversion.

In the case of monomeric compounds ultrasound has been used to facilitate hydrolysis in heterogeneous systems.

It has now been found that for the hydrolysis of polymeric amides the use of ultrasound can significantly improve both the rate of the reaction and degree of conversion achieved.

Accordingly, the present invention is a process for hydrolysing polymeric amides to the corresponding free acids at elevated temperatures in the presence of a hydrolysing agent, characterised in that the hydrolysis is carried out under the influence of ultrasound in a homogeneous reaction medium.

The polymeric amide to be hydrolysed is suitably polyacrylamide having a molecular weight (Mn) such that it is soluble in the reaction medium to form a homogeneous medium for hydrolysis. Thus the molecular weight (Mn) is suitably from 300 to 5,000,000 preferably from 1000 to 2,000,000.

The solvent for the polymer amide is suitably a single phase solvent. In the case of polyacrylamide the solvent is preferably water so that the hydrolysis takes place in aqueous solution.

The concentration of the polymeric amide in the solution being hydrolysed will depend upon the molecular weight (Mn) of the polymeric amide and the solubility thereof in the reaction medium. However, as a general guide, it is suitably in the range of 10 to 30% w/w, preferably from 10 to 15% w/w of the total solution.

The hydrolysing agent can be acidic or alkaline and is suitably alkaline. In the case of the hydrolysis of the polyacrylamide, the hydrolysing agent is preferably used as an aqueous solution in order to ensure homogeneity with the reaction medium which in this case is preferably water.

The amount of hydrolysing agent used will depend upon the polymeric amide being hydrolysed, the concentration of the amide and the nature of the agent. In the case of polyacrylamide (Mn = 7000 to 10,000) and an alkali metal hydroxide as the agent, the concentration of the polymeric amide being in the range of 10 to 15Z w/w in the aqueous reaction medium, the amount of alkali metal hydroxide used is preferably in the range from 30 to 35Z w/w, based on the polymeric amide.

The hydrolysis can be performed at elevated temperatures ranging from e.g. 50° C. to the boiling point of the homogeneous reaction medium inclusive of the polymeric amide and the hydrolysing agent. Thus, in the case of aqueous systems temperatures of up to 100° C. can be used.

The hydrolysis of the polymeric amide is carried out under the influence of ultrasound. Surprisingly, this has the effect of not only increasing the rate of the hydrolysis reaction but also the conversions achieved when compared with the same process without the influence of ultrasound.

The present invention suitably uses high power ultrasound levels, i.e. at least 10 W/cm$^2$ and preferably at least 20 W/cm$^2$. At these power levels, cavitation can occur in some cases in the reaction medium. Cavitation is a phenomenon that is well known and that is easy to detect visually in transparent apparatus, but is more difficult to define quantitatively. The standard test for detecting whether cavitation is occuring is the Aluminium Foil Test described by E.A. Neppiras, Physical Reports 61 No.3 p.251 (1980).

For the application of power ultrasound to a reaction medium it is necessary to cause some component in contact with the medium to vibrate at the required frequency. Complete systems are available commercially and generally comprise an ultrasonic transducer, a drive unit or a generator to activate the transducer and a means for transmitting the vibrations to the medium. Since the vibrations of the transducer element are small, a mechanical amplifier (usually referred to as a horn) is likely to be required given the power levels of the present invention. In these power levels expressed as watts per square centimeter the cross-sectional area of the tip of the horn is the area measurement used. Since the horn tip cross-sectional area may be less than 10 cm$^2$, the maximum power output of the equipment may need to be of the order of 200-500 W.

The upper limit of power level for the present invention is not critical, but, given the current availability of commercial ultrasonic equipment, may conveniently be 200 W/cm$^2$.

The ultrasonic frequency is also not critical provided it is in the power ultrasound range as distinct from the audible or diagnostic ranges. It may conventiently be from 16–80 KiloHertz. The higher the frequency, the greater the power needed to induce cavitation in the reaction medium and the frequency is preferably at the lower end of the range e.g. 16–30 KiloHertz. Horns capable of transmitting ultrasound at variable frequencies and power outputs are available and may be used to allow the frequency and power output for any reaction medium to be optimised.

The present invention is particularly suited to making e.g. polyacrylic acid from polyacrylamide due to the shortage of acrylic acid otherwise used as the source of polyacrylic acid.

The present invention is further illustrated with reference to the following Examples and comparative tests.

EXAMPLE 1 AND COMPARATIVE TEST 1 (NOT ACCORDING TO THE INVENTION)

The following general procedure was used in all the experiments: An aqueous solution (vol 100ml) containing 26.6% solid polyacrylamide was supplied by Allied Colloids. The solution was used as supplied and an aliquot of sodium hydroxide (67% w/w aqueous solution) added to promote the hydrolysis reaction.

In order to compare the effect of ultrasound on the hydrolysis against heat when used alone, the solution of polyacrylamide containing the alkali was split into two. An aliquot was placed in a Raman hot cell, pre-set at 50° C. while the second aliquot was subjected to ultrasound at 50° C.

The source of the ultrasonic energy was a Branson model 250 sonifier fitted with a 0.5 inch diameter horn. The energy used at the horn was read from a power meter on the control box and converted to acoustic energy from a calibration graph.

The aliquot of the solution was placed in the ultrasonic cell and the horn immersed to a depth of 10mm such that the depth of liquid below the horn was 26mm. Sonication was started at 50% power level and the jacket temperature was raised to 36° C. to maintain a reaction temperature of 50° C. Sonication was carried out at 20 kHz over three hours.

Samples were extracted from the systems at regular intervals. Raman spectra were recorded from the samples using an Anaspec model LR-33 Raman spectrometer interfaced to a Jobin-Yvon spectra link data acquisition system and the intensity of the band positioned at 1286cm-1 monitored. (C-N stretching mode to monitor the rate of depletion of polyacrylamide from the solution which is then computed into % conversion). At this frequency the observed decrease in band intensity was consistent with chemical changes in the reaction. The samples were irradiated with 200 mW laser power using 514.5 nm exicitation from a Spectra Physics argon-ion laser, model 165, operating in the power mode.

The band intensities recorded over the three hours for the heat treatment are given in Table 1. Similar data obtained from the sonicated samples are present in Table 2. A kinetics programme was subsequently applied to the data and the percentage conversion values are presented in Table 3.

The conversion value obtained after three hours of heat treatment alone was 60% while a corresponding value of 71% was obtained when ultrasound was used.

$$\% \text{ conversion} = \left(1 - \frac{\text{peak intensity at time } t}{\text{peak intensity at time 0}}\right) \times 100\%$$

Samples of the final products from both experiments were submitted for $^{13}C$ NMR analysis to distinguish between acrylic acid, polyacrylic acid, polyacrylamide and acrylamide, and the results were found to be in good agreement with those found in this study.

TABLE 1

VARIATION IN INTENSITY OF RAMAN BAND AT 1286 cm-1 WITH TIME FOR HEAT TREATMENT (50° C.)
(Comparative Test 1)

| Time (min) | Intensity (photon counts per s) |
|---|---|
| 20 | 2000 |
| 40 | 1740 |
| 60 | 1800 |
| 80 | 1620 |
| 100 | 1500 |
| 120 | 1400 |
| 140 | 1160 |
| 160 | 910 |
| 180 | 800 |

TABLE 2

VARIATION IN INTENSITY OF RAMAN BAND AT 1286 cm-1 WITH TIME FOR ULTRASOUND TREATMENT (50° C.)
(Example 1)

| Time (min) | Intensity (photon counts per s) |
|---|---|
| 30 | 1710 |
| 60 | 820 |
| 90 | 620 |
| 120 | 600 |

TABLE 2-continued

VARIATION IN INTENSITY OF RAMAN BAND AT 1286 cm-1 WITH TIME FOR ULTRASOUND TREATMENT (50° C.)
(Example 1)

| Time (min) | Intensity (photon counts per s) |
|---|---|
| 150 | 560 |
| 180 | 510 |
| 210 | 510 |

TABLE 3

PERCENTAGE CONVERSION OF POLYACRYLAMIDE POLYACRYLIC ACID FOR THE SYSTEMS STUDIED

| | % Conversion | |
|---|---|---|
| Time (min) | Comp. Test 1 Heat (50° C.) | Example 1 Ultrasound (50° C.) |
| 20 | 14 | — |
| 30 | — | 52.5 |
| 40 | 11 | — |
| 60 | 19.5 | 64 |
| 80 | 26 | — |
| 90 | — | 66 |
| 100 | 31 | — |
| 120 | 42.5 | 68 |
| 140 | 55.5 | — |
| 150 | — | 71 |
| 160 | 61 | — |
| 180 | — | 71 |

EXAMPLES 2 AND 3 AND COMPARATIVE TESTS 2 AND 3

The general procedure of Example 1 was repeated except that the duration of the reaction and the heat treatment temperatures were varied as shown in the tabulated results below.

The band intensities recorded over a 30 minutes duration using ultrasound and heat treatment at 70° and 90° C. are presented in Tables 4 and 5 below respectively.

The corresponding intensities for heat treatment above observed over a period of 3 hours at 70° and 90° C. respectively are shown in Tables 6 and 7.

In the case of the conversion data for the experiments in Tables 4 and 5, the quality of the Raman data deteriorated after 30 minutes and it was assumed that this was due to the hydrolysis reaction proceeding to completion. In these cases the conversions was studied by NMR analysis of the products which gave an estimate of the degree of conversion to the desired products. The NMR technique used was as follows:

TABLE 4

VARIATION IN BAND INTENSITY AT 1286 cm-1 WITH TIME FOR ULTRASOUND TREATMENT (70° C.)
(Example 2)

| Time (min) | Intensity (photon counts per sec) | % Conversion |
|---|---|---|
| 0 | 1776 | — |
| 5 | 1370 | 22.9 |
| 10 | 1301 | 26.7 |
| 15 | 1608 | — |
| 20 | 973 | 45.2 |
| 25 | 854 | 51.9 |
| 30 | 862 | 51.5 |

TABLE 5

VARIATION IN BAND INTENSITY AT
1286 cm⁻¹ WITH TIME FOR ULTRASOUND
TREATMENT (90° C.)
(Example 3)

| Time (min) | Intensity (photon counts per sec) | % Conversion |
|---|---|---|
| 0 | 1776 | — |
| 3 | — | — |
| 6 | 1236 | 30.4 |
| 9 | 1006 | 43.4 |
| 12 | NR | (59) |
| 15 | NR | — |
| 18 | NR | — |

( ) Reading obtained from NMR data
NR Value not determined since original band almost disapeared.

TABLE 6

VARIATION IN BAND INTENSITY AT
1286 cm⁻¹ WITH TIME FOR HEAT
TREATMENT (70° C.) ALONE
(Comparative Test 2)

| Time (min) | Intensity (photon counts per sec) | % Conversion |
|---|---|---|
| 0 | 1332 | |
| 30 | 1025 | 13.0 |
| 90 | 1000 | 24.9 |
| 120 | 897 | 32.7 |
| 180 | — | — |
| 180 | — | — |

TABLE 7

VARIATION IN BAND INTENSITY AT
1286 cm⁻¹ WITH TIME FOR HEAT
TREATMENT (90° C.) ALONE
(Comparative Test 3)

| Time (min) | Intensity (photon counts per sec) | % Conversion |
|---|---|---|
| 0 | 1551 | — |
| 30 | 1312 | 15.4 |
| 60 | 894 | 42.4 |

TABLE 7-continued

VARIATION IN BAND INTENSITY AT
1286 cm⁻¹ WITH TIME FOR HEAT
TREATMENT (90° C.) ALONE
(Comparative Test 3)

| Time (min) | Intensity (photon counts per sec) | % Conversion |
|---|---|---|
| 120 | 953 | 38.6 |
| 180 | 194 | 87.5 |

We claim:

1. A process for hydrolysing polymeric amides to the corresponding free acids at elevated temperatures in the presence of a hydrolysing agent, characterised in that the hydrolysis is carried out under the influence of ultrasound at levels of at least 10W/cm² in a homogeneous reaction medium.

2. A process according to claim 1 wherein the polymeric amide is polyacrylamide, the molecular weight thereof being such that it is soluble in the reaction medium to form a homogeneous medium for hydrolysis.

3. A process according to claim 1 wherein the hydrolysis is carried out in aqueous solution.

4. A process according to claim 1 wherein the hydrolysis agent is acidic or alkaline.

5. A process according to claim 1 wherein the polymeric amide is polyacrylamide having a number average molecular weight of 700–10000, the hydrolysing agent is an alkali metal hydroxide, the concentration of the amide in the reaction medium is 10–15%w/w in the aqueous reaction medium and the amount of the alkali metal hydroxide is 30–35%w/w based on the polymeric amide.

6. A process according to claim 1 wherein the hydrolysis is carried out at a temperature ranging from 50° C. to the boiling point of the homogeneous reaction medium inclusive of the polymeric amide and the hydrolysing agent.

7. A process according to claim 1 wherein polyacrylamide is hydrolysed to polyacrylic acid.

8. A process for hydrolyzing polymeric amides to the corresponding free acids at an elevated temperature in the presence of a hydrolyzing agent, the improvement which comprises carrying out the hydrolysis under the influence of ultrasound at levels of at least 10 Watts/cm² and a frequency of from 16–80 Kilo Hertz.

* * * * *

UNITED STATES PATENT AND TRADEMARK OFFICE
CERTIFICATE OF CORRECTION

PATENT NO. : 5,081,195
DATED : January 14, 1992
INVENTOR(S) : MARTIN P. ATKINS et al It is certified that error appears in the above-identified patent and that said Letters Patent is hereby corrected as shown below:

Col. 1, l. 56, change "15Z" to --15%--.

Col. 1, l. 58, change "35Z" to --35%--.

Signed and Sealed this

Twentieth Day of April, 1993

Attest:

MICHAEL K. KIRK

Attesting Officer   Acting Commissioner of Patents and Trademarks